United States Patent [19]

Loustaunau

[11] 4,099,480
[45] Jul. 11, 1978

[54] ROTATION INDICATORS FOR CASSETTE REELS

[75] Inventor: Louie E. Loustaunau, Los Angeles, Calif.

[73] Assignee: Raymond Lee Organization, Inc., a part interest

[21] Appl. No.: 728,306

[22] Filed: Sep. 30, 1976

[51] Int. Cl.² .................. G01P 13/00; G25B 27/00
[52] U.S. Cl. .................. 116/135; 116/114 R; 116/115
[58] Field of Search .................. 116/114 J, 67 A, 135, 116/115; 242/57, 71.8, 197; 81/3.1, 3.35, 3 R; 215/296, 298; 360/137; 29/578

[56] References Cited

U.S. PATENT DOCUMENTS

| 789,064 | 5/1905 | Reed et al. | 81/3.1 R |
|---|---|---|---|
| 1,855,411 | 4/1932 | O'Neill, Jr. | 215/298 |
| 2,367,514 | 1/1945 | Mihalyi | 242/71.8 |
| 2,497,827 | 2/1950 | Trafton | 220/307 |
| 2,756,279 | 7/1956 | Lang | 360/137 X |
| 2,937,386 | 5/1960 | Perretz | 220/307 X |
| 3,074,546 | 1/1963 | Burgess et al. | 116/114 J |
| 3,236,002 | 4/1963 | Cunningham et al. | 220/306 X |
| 3,240,348 | 3/1966 | Serio | 220/306 X |
| 3,357,546 | 12/1967 | Mathus | 116/114 J |
| 3,406,412 | 10/1968 | Kottas | 81/3 R X |
| 3,407,781 | 10/1968 | Ardire et al. | 116/114 J |
| 3,937,347 | 2/1976 | Cottingham | 215/296 |

FOREIGN PATENT DOCUMENTS 2,333,609   1/1975   Fed. Rep. of Germany ....... 242/191

*Primary Examiner*—Daniel M. Yasich

[57] ABSTRACT

A flat disc with a central hole is attached to a reel in a tape cassette by three legs that extend downwardly from the disc to detachably engage corresponding spokes in the cassette reel. The invention is designed to be used in pairs, an extractor is provided for removing the disc from the reel.

2 Claims, 10 Drawing Figures

U.S. Patent  July 11, 1978  4,099,480
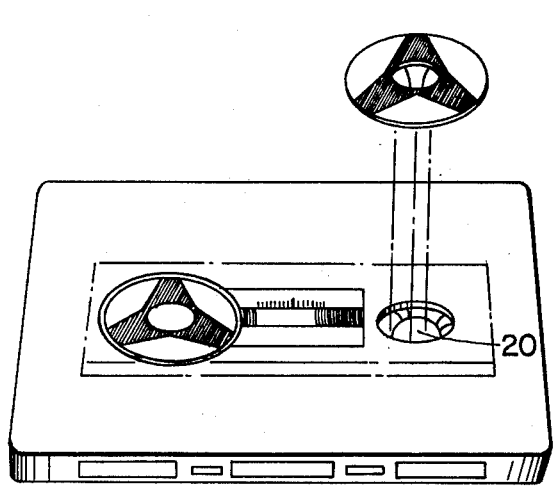
FIG. 1
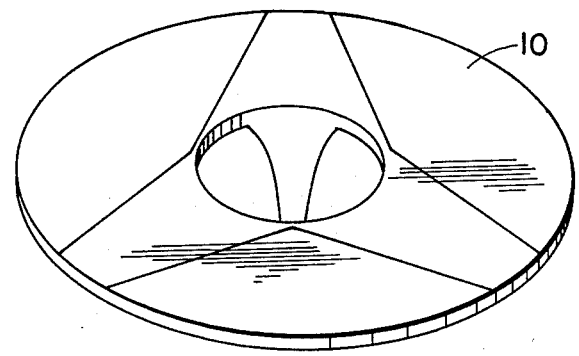
FIG. 2
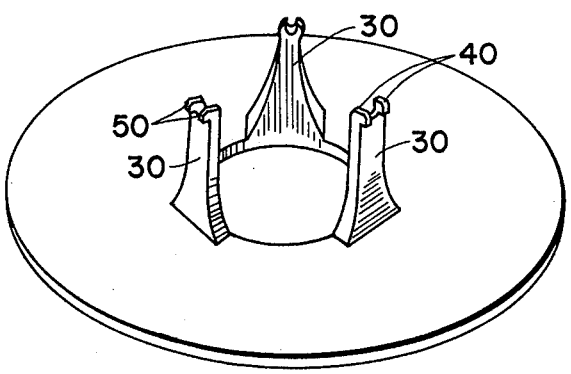
FIG. 3
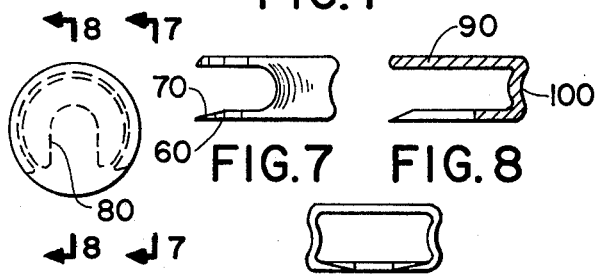
FIG. 6  FIG. 7  FIG. 8  FIG. 9
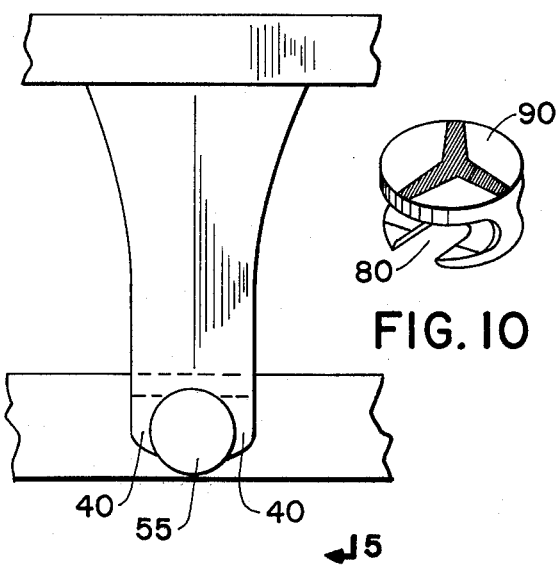
FIG. 4
FIG. 10
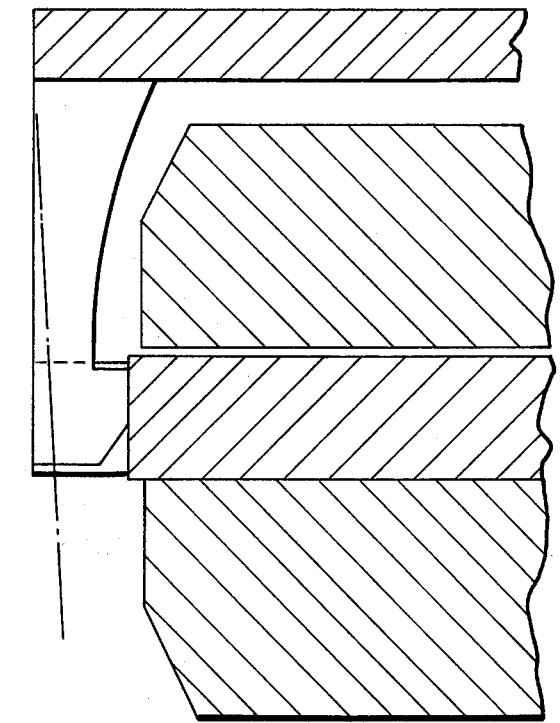
FIG. 5 ced by jerky
ROTATION INDICATORS FOR CASSETTE REELS

BACKGROUND OF THE INVENTION

Conventional tape cassettes contain two reels which are connected by recording tape that is wound off one reel onto the other by a tape machine. Because this tape sometimes binds, the takeup reel can, on occasion, stop moving. in this event, the machine will begin to chew up the tape. This binding is usually preceeded by jerky rotation of the takeup reel, which, if noticed in time, will allow the cassette to be removed from the machine before any damage is done.

Each of the reels in such a cassette has an open center portion which has a plurality of radially inwardly extending spokes. These reels are rotated by shafts driven by the machine, which shafts have radially outwardly extending paddles that engage corresponding pairs of spokes. Because of the number of spokes, there are always at least three spokes that are unoccupied.

SUMMARY OF THE INVENTION

This invention is designed to provide an indicator that can be attached to the reels of a tape cassette while the cassette is being used in a tape machine. The indicator takes the shape of a disc that is much larger in size than the reel centers and that is colored to make it easy to observe its rotation. An extractor is provided for removing the disc from the reel.

BRIEF DESCRIPTION OF THE DRAWINGS

FIG. 1 shows the invention in use.

FIG. 2 is a drawing of the invention as viewed from the top.

FIG. 3 is a drawing of the invention as viewed from the bottom.

FIG. 4 is a drawing of a portion of the invention.

FIG. 5 is a cross-sectional view of the invention in use. FIGS. 6, 7, 8 and 9 are, respectively, top, side, side cross-sectional and front views of the extractor used with the invention.

FIG. 10 is a drawing of the extractor shown in FIGS. 6-9.

DETAILED DESCRIPTION OF PREFERRED EMBODIMENTS

A flat circular disc 10 has a hole in its center of approximately the size of one of the reel centers 20. Extending downwardly from the periphery of the hole at the vertices of an imaginary equilateral triangle are three like legs 30. Each leg terminates in a claw such as is shown in expanded view in FIG. 4. Each claw has two opposed fingers 40 which have curved inner surfaces and which are biased toward each other. The tips of the fingers have radially outwardly projecting sections 50.

The disc and legs are all injection molded, and form a unitary member, with the legs being biased radially outwardly and the plastic being slightly flexible. Hence, when the device is pressed downwardly into a reel center, each of the claws deforms slightly to receive a corresponding spoke 55 with sections 50 being pressed against the interior of the reel. To allow the discs to rotate freely, the discs do not touch the cassette itself, but rather lie parallel to it and some distance above it.

An extractor has a wedge with a flat bottom surface 60 and an upwardly and rearwardly extending top surface 70. The wedge has a circular periphery, and has a U-shaped empty recess 80 extending rearwardly from the center of the front of the wedge. On top of the wedge is a circular flat handle 90 that is located on top of the wedge and is attached to it by a curved wall 100 at the rear of the handle and wedge. The recess is big enough to fit on either side of the hole in the center of the disc. Thus, when the disc is placed on the top of a cassette, the disc can be prized off by introducing the edge of the wedge beneath the edge of the disc, centering the extractor on the center of the disc, and pulling the extractor away from the cassette body.

I claim:

1. Apparatus for use with a reel in a tape cassette comprising:
an indicator to be removably inserted in the center of a reel to enable the reel rotation to be observed, said indicator including a flat circular disc with a central hole, and a plurality of equidistantly spaced like flexible legs extending downwardly from the bottom of the disc from points located around the periphery of the hole, each leg having a projection means at its free end whereby each leg can be detachably secured to a corresponding spoke in the cassette reel to maintain said indicator disc spaced from the reel, each leg being biased radially outwardly, each claw having two opposed fingers having curved inner surfaces and biased toward each other whereby each claw can hold said corresponding spoke between the fingers, each finger having a tip with a radially outwardly projecting section.

2. An extractor for the indicator device of claim 1 comprising a wedge for removing the indicator disc from the reel, said wedge having a flat bottom surface, an upwardly and rearwardly extending top surface and an empty U-shaped recess extending rearwardly from the center of the forward edge of the wedge, said wedge having a circular periphery, and a flat handle disposed on top of the wedge and secured thereto by a curved wall at the rear of the handle and wedge.

* * * * *